(12) United States Patent
Li et al.

(10) Patent No.: US 10,647,174 B2
(45) Date of Patent: May 12, 2020

(54) IN-CAR TEMPERATURE-CONTROLLING DEVICE FOR CAR IN PARKED STATE

(71) Applicant: NATIONAL CHIN-YI UNIVERSITY OF TECHNOLOGY, Taichung (TW)

(72) Inventors: Kuo Yi Li, Taichung (TW); Yu Shan Wei, Taichung (TW); Jie Ru Lu, Taichung (TW); Bing Wei Wu, Taichung (TW); Yi Lung Chiu, Taichung (TW); Sy Cheng, Taichung (TW); Ching Jan Shiu, Taichung (TW)

(73) Assignee: National Chin-Yi University of Technology, Taichung (TW)

( * ) Notice: Subject to any disclaimer, the term of this patent is extended or adjusted under 35 U.S.C. 154(b) by 430 days.

(21) Appl. No.: 15/700,428

(22) Filed: Sep. 11, 2017

(65) Prior Publication Data
US 2017/0368905 A1 Dec. 28, 2017

Related U.S. Application Data

(63) Continuation-in-part of application No. 15/066,109, filed on Mar. 10, 2016, now abandoned.

(30) Foreign Application Priority Data

Mar. 13, 2015 (TW) .............................. 104203749 U

(51) Int. Cl.
*B60H 1/00* (2006.01)
*B60W 10/30* (2006.01)
*B60W 10/06* (2006.01)

(52) U.S. Cl.
CPC ..... *B60H 1/00657* (2013.01); *B60H 1/00778* (2013.01); *B60H 1/00814* (2013.01); *B60W 10/06* (2013.01); *B60W 10/30* (2013.01)

(58) Field of Classification Search
CPC ............ B60H 1/00657; B60H 1/00814; B60H 1/00778; B60H 1/00; B60W 10/06; B60W 10/30
See application file for complete search history.

(56) References Cited

U.S. PATENT DOCUMENTS

| | | | | |
|---|---|---|---|---|
| 2012/0029729 A1* | 2/2012 | Weslati | .............. | B60H 1/00385 701/2 |
| 2012/0116608 A1* | 5/2012 | Park | ................... | B60H 1/00657 701/2 |
| 2017/0225541 A1* | 8/2017 | Shimoda | .................. | B60H 1/24 |

* cited by examiner

*Primary Examiner* — Genna M Mott
(74) *Attorney, Agent, or Firm* — Rosenberg, Klein & Lee

(57) ABSTRACT

An in-car temperature-controlling device for a car in its parked state uses a wireless remote control to remotely control a power-activating unit, an engine-starting unit, a window-activating unit and an AC-activating unit of the car, so as to adjust the car's in-car temperature. Its installation is easy and needs no structural changes to the car, so the car using the device can, in its parked state, have its in-car temperature prevented from being too high or too low. The in-car temperature-controlling device is characterized in contributing to convenience, safety, comfort and low costs, and is applicable to all existing and newly built cars.

8 Claims, 5 Drawing Sheets

IN-CAR TEMPERATURE-CONTROLLING DEVICE FOR CAR IN PARKED STATE

REFERENCE TO RELATED APPLICATION

This Application is being filed as a Continuation-in-Part of U.S. patent application Ser. No. 15/066,109, filed 10 Mar. 2016, currently pending, which was based on Taiwan Application No. 104203749, filed 13 Mar. 2015.

BACKGROUND OF THE INVENTION

1. Technical Field

The present invention relates to temperature control for cars, and more particularly to an in-car temperature-controlling device for a car which is in its parked state, wherein the in-car temperature-controlling device is designed to be easily installed on the car without structural changes to the car.

2. Description of Related Art

Taiwan Patent No. I285161 provides a method for heat dissipation in a car. The method of the prior patent mainly involves a water tank, a pump, a control valve, nozzles and a remote control. In use, the remote control transmits a signal to the car's receiver so as to activate the pump of the water tank. The pump supplies cooling liquid to the nozzle so that the nozzles atomize the cooling liquid and spray it inside the car, thereby cooling the in-car environment quickly and making the driver feel comfortable. However, the sprayed cooling liquid may dampen papers in the car, putting important documents in risk. The sprayed cooling liquid may also have odor unpleasant to the passengers in the car. Besides, the patented device requires additional installation of the water tank and nozzles, which may aesthetically ruin the car's interior design and adds costs.

Taiwan Patent No. I303224 provides a device for rapid cooling a car cabinet and a method for operating the device. The patent primarily uses a bottle, a pump, conducts and nozzles. The on-off valve disconnects the nozzles and the conducts. Then the pump accumulates pressure in the bottle. Afterward, the on-off valve is on to make the cooling liquid pressurized in the bottle to flow to the nozzles through the conducts and become atomized, thereby cooling the in-car environment quickly. However, similar to the patent discussed previously, the sprayed cooling liquid may dampen papers in the car, putting important documents in risk. The sprayed cooling liquid may also have odor unpleasant to the passengers in the car. Besides, the patented device requires additional installation of the water tank and nozzles, which may aesthetically ruin the car's interior design and adds costs.

Taiwan Patent No. M370513 provides a heat radiator for a car cabinet. The patented device has solar panels, a top housing, an air-suction system and a bottom housing. The solar panels generate power to operate the air-suction system, which expels hot air from the car cabinet, thereby lowering the in-car temperature. However, the patented device is designed for cars having a sunroof, and is not applicable to cars without a sunroof. Additionally, installation of the patented device unavoidably breaks the structural integrity of the car, and may in turn induce problems such as water permeation and increased noise.

Taiwan Patent No. M435998 provides a window-based solar heat-dissipating device. The patent includes a span seat, a wind unit and solar panels. The patent uses solar power to operate the fan system, thereby lowering the in-car temperature. However, the patented device is mounted on a car window, and may cause problems such as water permeation, noise, thievery and aesthetic degradation. Besides, its installation is relatively complicated, and the components left outside the window can increase wind drag acting on the car.

Taiwan Patent No. M250827 provides a roof-mounted heat-dissipating device for a car. The patent primarily comprises a heat insulation barrel, a water pump, a temperature sensor, a reflective membrane and a heat sink. The condensed water from the AC refrigerant pipe is delivered to the car's roof, thereby lowering the in-car temperature. However, the patent requires structural changes of the car, including installation of the heat sink and the water pump at the car's roof, and may also cause problems related to water permeation, noise and aesthetic degradation.

SUMMARY OF THE INVENTION

The primary objective of the present invention is to provide an in-car temperature-controlling device for a car in its parked state, which features for not requiring any structural changes of the dissipation and being easy to install.

For achieving the foregoing objective, the disclosed in-car temperature-controlling device comprises:

a wireless remote control, for a user to use to remotely transmit an operational signal;

a receiver, installed in the car for receiving the operational signal from the wireless remote control and correspondingly sending a control signal;

a controller circuit board, for receiving and processing the control signal output by the receiver and outputting the processed control signal as a control command; and a motherboard, for receiving the control command output by the controller circuit board and being electrically connected to a power-activating unit, an engine-starting unit, a window-activating unit and an AC-activating unit of the car, wherein the motherboard, according to the control command, controls the power-activating unit, the engine-starting unit, the window-activating unit and the AC-activating unit to operate in order.

Preferably, the receiver, the controller circuit board and the motherboard are housed in a control box.

Preferably, the wireless remote control is provided with four control buttons, each for turning on and off one of the power-activating unit, the engine-starting unit, the window-activating unit and the AC-activating unit. The wireless remote control is further provided with an automatic control button for activating an IC-activating unit that makes the power-activating unit, the engine-starting unit, the window-activating unit and the AC-activating unit automatic start in order.

Preferably, transmission of the operational signal between the wireless remote control and the receiver is achieved by using one of 3G, 4G, WIFI, Bluetooth and infrared transmission.

DETAILED DESCRIPTION OF THE INVENTION

Figure 1:
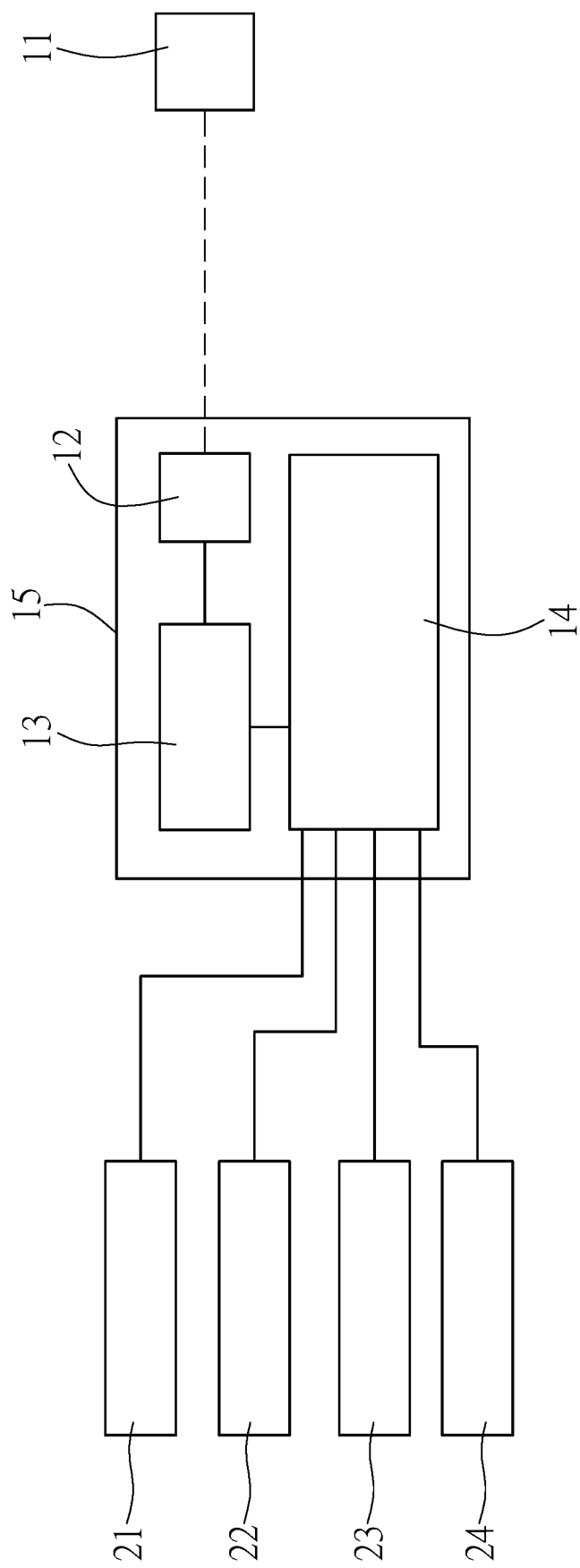
FIG. 1 schematically shows the structure of the present invention.
Figure 2:
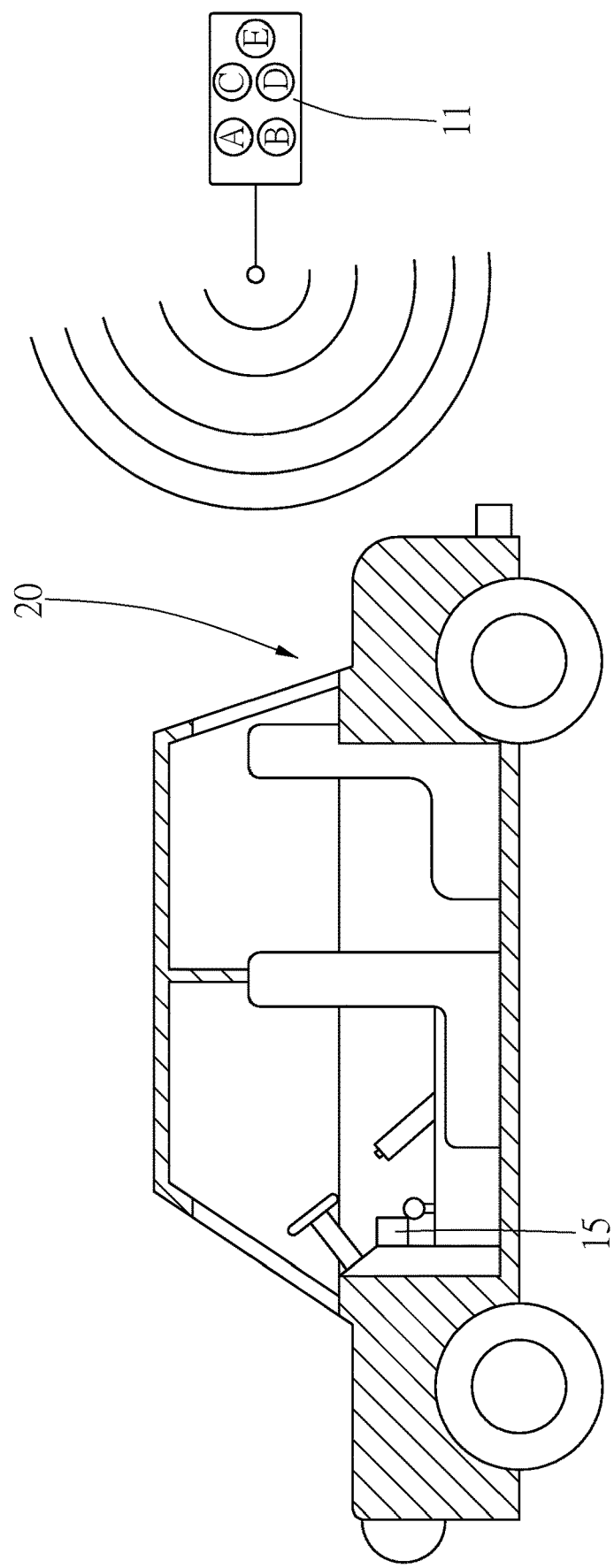
FIG. 2 is a schematic drawing illustrating the use of the present invention.
Figure 3:
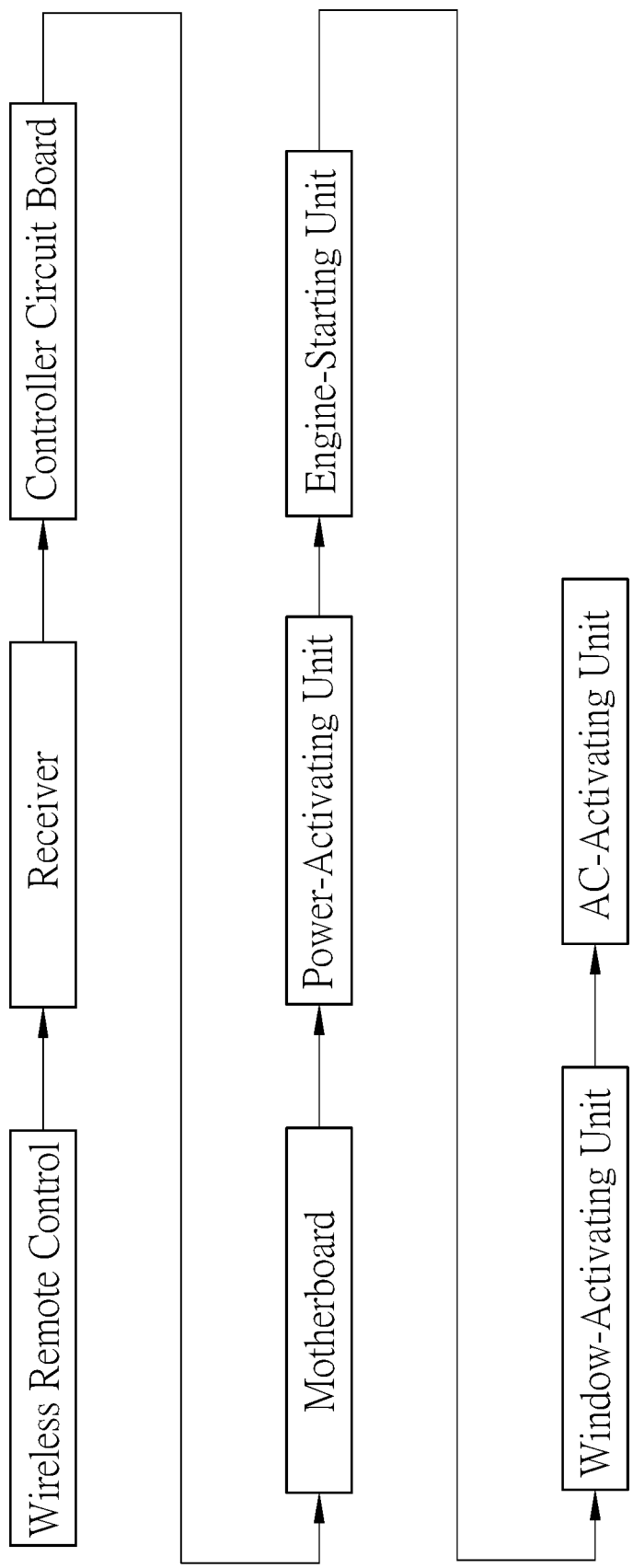
FIG. 3 is a flowchart of the operation of the present invention.

Referring to FIG. 1 through FIG. 3, in the present invention, an in-car temperature-controlling device for a car in its parked state primarily comprises a wireless remote control 11, a receiver 12, a controller circuit board 13 and a motherboard 14.

The wireless remote control 11 is for a user to operate so as to remotely send an operational signal.

The receiver 12 is installed in the car 20, and is composed of a chip receiver device (not shown). The receiver 12 serves to receive the operational signal transmitted by the wireless remote control 11, and correspondingly output a control signal. Therein, the transmission of the operational signal between the wireless remote control 11 and the receiver 12 may be one of 3G, 4G, WIFI, Bluetooth and infrared transmission.

The controller circuit board 13 is also installed in the car 20, and serves to receive the control signal output by the receiver 12. The controller circuit board 13 determines and re-encodes the control signal it receives and correspondingly outputs a control command.

The motherboard 14 is also installed in the car 20, and serves to receive the control command output by the controller circuit board 13. The motherboard 14 is electrically connected to a power-activating unit 21, an engine-starting unit 22, a window-activating unit 23 and an AC-activating unit 24 of the car 20, so that the motherboard 14 can control the power-activating unit 21, the engine-starting unit 22, the window-activating unit 23 and the AC-activating unit 24 to work in order in accordance with the control command.

In the present embodiment, the receiver 12, the controller circuit board 13 and the motherboard 14 are all housed in a control box 15, which is settled at an appropriate site near the driver's seat in the car. The motherboard 14 is electrically connected to the power-activating unit 21, the engine-starting unit 22, the window-activating unit 23 and the AC-activating unit 24 of the car through concealed wiring circuits The wireless remote control 11 is provided with four control buttons A, B, C, D each for turning on and off one of the power-activating unit 21, the engine-starting unit 22, the window-activating unit 23 and the AC-activating unit 24.

To use the disclosed device in summer, a user may be at a place up to 50 meters from where the car is parked and press the control button A on the wireless remote control 11 corresponding to the power-activating unit 21. At this time, the wireless remote control 11 sends out an operational signal to the receiver 12 for powering on the car. The operational signal then, through the controller circuit board 13 and the motherboard 14 successively, controls the power-activating unit 21 of the car 20 to operate, so that the 12-V power source (a battery) of the car 20 turns on the car 12.

The user can then press the control button B on the wireless remote control 11 corresponding to the engine-starting unit 22. At this time, the wireless remote control 11 sends out an operational signal to the receiver 12 for starting the car's engine. The operational signal then, through the controller circuit board 13 and the motherboard 14 successively, controls the engine-starting unit 22 of the car 20 to operate, so that the engine of the car 20 is started and drives the generator to generate power. At this time, all power-consuming units in the car 20 are well electrified.

Afterward, the user presses the control button C on the wireless remote control 11 corresponding to the window-activating unit 23. At this time, the wireless remote control 11 sends out an operational signal to the receiver 12 for activating windows of the car 20. The operational signal then, through the controller circuit board 13 and the motherboard 14 successively, controls the window-activating unit 23 of the car 20 to operate, so that the main switch of the power-operated windows turns on a parallel-connected circuit to simultaneously wind down the four windows of the car 20 for an appropriate distance (about 5 cm). With natural thermal convection, these gaps allow the muggy air inside the car 20 to flow out to the exterior and allow the fresh air to come into the car 20, thereby making the in-car air start to cool.

Then the user presses the control button D on the wireless remote control 11 corresponding to the AC-activating unit 24. At this time, the wireless remote control 11 sends out an operational signal to the receiver 12 for activating the air conditioner. The operational signal then, through the controller circuit board 13 and the motherboard 14 successively, controls the AC-activating unit 24 of the car 20 to operate and turn the fan to the highest level. At this time, the strong cool airflow shove the hot air remaining in the car 20, thereby making the in-car air cool quickly.

In use, the present invention contributes to fast cooling through the process of first activating the window-activating unit 23 and then activating the AC-activating unit 24 on the following principle.

Figure 4:
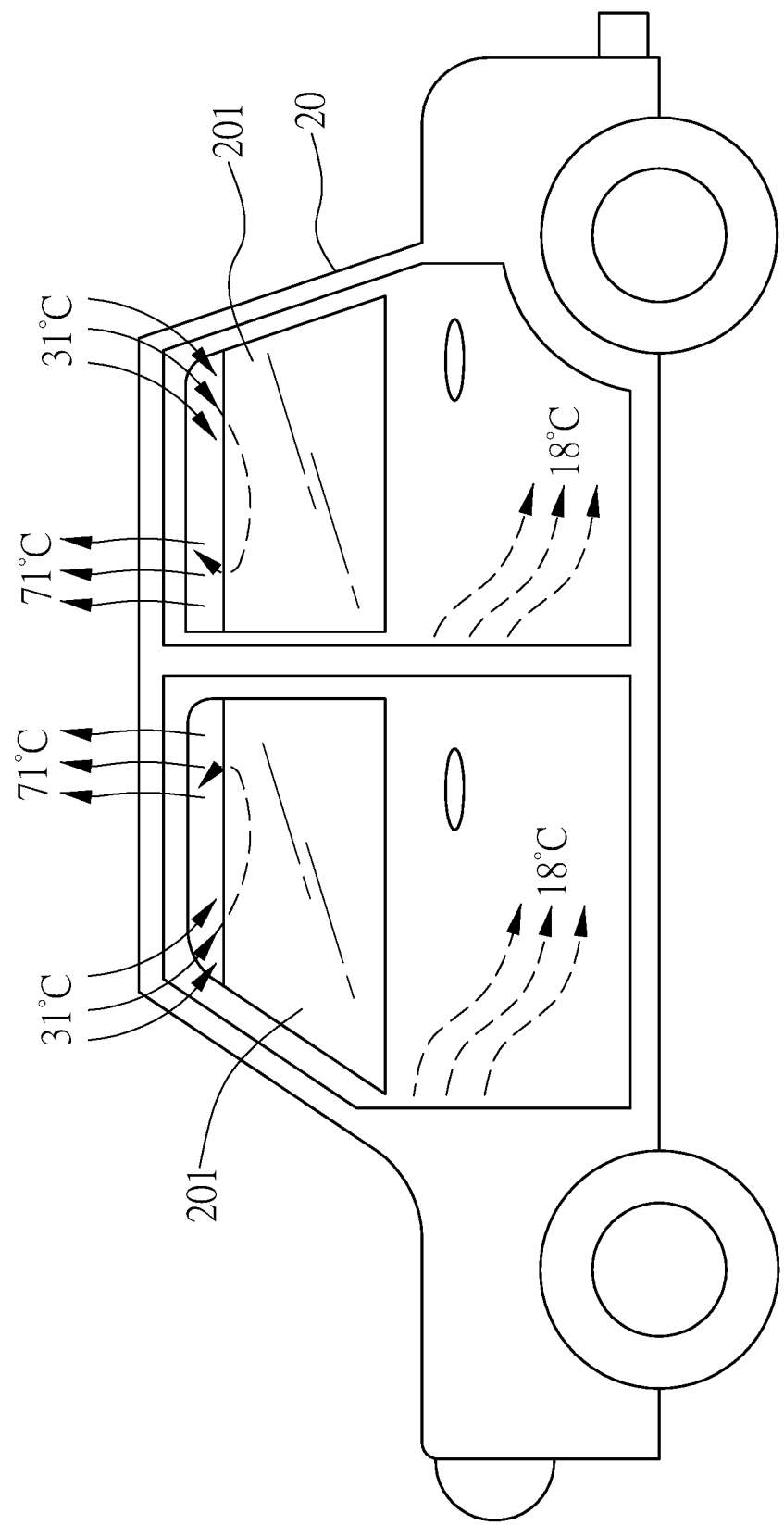
FIG. 4 is a schematic drawing that illustrates the heat dissipation airflow generated in the structure of the present invention.

As shown in FIG. 4, when the outside temperature is 31° C., and the air in the closed car gradually becomes hotter from 31° C. to 71° C. (i.e. when the car is parked), the air in the car undergoes thermal expansion, so the in-car air is less dense and more pressured. Then, when the window-activating unit 23 operates to move the four windows 201 of the car downward for about 5 cm synchronously, openings form above the windows to communicate the in-car space and the outside. As a result, the in-car 71° C. hot air that has expanded can immediately rush out of the car, so the in-car air is depressurized. This depressurization then draws air outside that is 31° C. and has higher density into the car in the same high speed. The newly entering air in turn shoves the in-car, 71° C., low-density, hot air out of the car, and this forms a hot air convection layer. Since the windows only move a proper distance (about 5 cm), turbulent flow otherwise caused by other external factors can be prevented more effectively.

Afterward, the AC-activating unit 24 is activated, so 18° C. cool air having higher density can be generated in the car and blown downward. The cool air then moves upward gradually from the bottom of the in-car space and pushes the hot air convection layer above it, so that the hot air can be pushed out of the car rapidly. In this manner, all three of the 71° C. air, the 31° C. air, and the 18° C. cool air jointly form airflow of a triangular helix structure with pressure differences therein (hereinafter referred to as the "triangular helix airflow having pressure differences") therein, so as to lower the in-car temperature rapidly.

Figure 5:
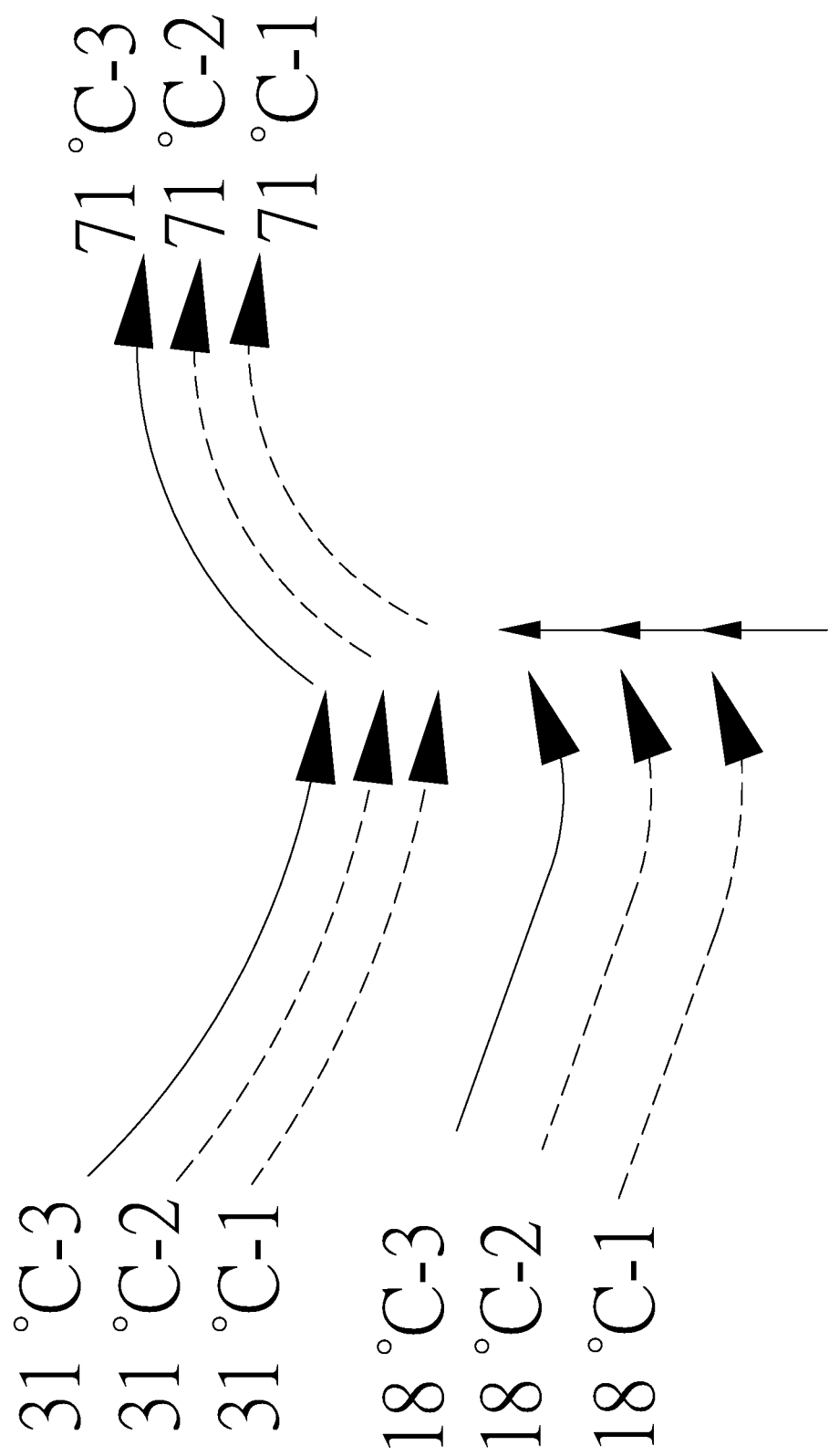
FIG. 5 is a schematic drawing that explains shove of hot air according to the present invention.

The present invention uses the triangular helix airflow having pressure differences that lowers the in-car temperature rapidly. As shown in FIG. 5, since the hot air at 71° C. has lower density, is is expelled from the car first when the windows 201 move down ward. Then the outside air at 31° C. can enter the car and shove out the 71° C. hot air. The 31° C. air is then pushed out by the 18° C. cool air continuously moving upward from the bottom of the in-car space, so the hot air can be expelled through the openings of the windows rapidly.

Referring to FIG. 5, the foregoing process and results are illustrated in detail as below:

As a first functional aspect, the outside air 31° C-1 shoves the hot air 71° C-1 out of the car, and the cool air 18° C-1 gives an upward pushing force from below;

As a second functional aspect, the air 31° C.-2 shoves the hot air 71° C.-2 out of the car, and the cool air 18° C-2 gives an upward pushing force from below;

As a third functional aspect, the air 31° C-3 shoves the hot air 71° C-3 out of the car, and is pushed upward by the cool air 18° C-3, until the hot air is expelled from the car.

After the 71° C. hot air is expelled from the car, the four windows are moved upward and thereby closed synchronously at once (not shown). Then the 18° C. cool air and the 40° C. in-car air continuously perform thermal exchange. Thereby, the in-car environment can become a comfortable space at 26° C. within 3 minutes after the AC-activating unit 24 is activated.

The disclosed device configured as above provides the following advantages:

1. Comfort: in hot summer, when a car is parked under outdoor sunlight, the in-car air temperature can become hot and muggy rapidly. Once the driver opens the door, the hot air will hit him/her directly as great discomfort. With the present invention, the driver can stand away from the car up to 50 meters and easily lower the in-car temperature to about 26° C. by operating the wireless remote control four times, thus providing a much more comfortable in-car environment as compared to the case where the disclosed device is not used.

2. Safety: the exiting car in-car temperature-controlling devices achieve heat dissipation by using car windows, sunroofs, water mist and water flow, and bring about problems related to rainwater permeation, noise, car structural changes, gaps and thievery. Opposite to the prior-art devices, the present invention does not require any car structural changes, and allows the driver to operate the wireless remote control to wind down the four car window by 5 cm to provide effective heat dissipation on the principle of thermal convection. This prevents from thievery, and even a thief tries to enter the car, the driver can use the wireless remote control to turn off the car's engine-starting unit rapidly. Thus, the disclosed device contributes to safe use.

3. Convenience: in a hot parking lot, without the disclosed device, the driver sitting in the furnace-like can only open the four windows to make hot air flow out, and drive the car to a cool place to wait for natural cooling of the in-car environment. The operation is thus very inconvenient. With the disclosed device, the driver only needs to install the receiver, the microcontroller circuit board and the motherboard integrated in a single small control box, without having esthetic impact on the car's interior, and he/she can stand at a remote, cool place to use the wireless remote control to operate the car's power-activating unit, engine-starting unit, window-activating unit and AC-activating unit through the concealed circuit, thereby lowering the in-car temperature to about 26° C. Thus, the disclosed device contributes to convenient use.

4. Low costs: the components used in the disclosed device, including the wireless remote control, the receiver, the controller circuit board and the motherboard, are all scandalized components and are inexpensive. Especially, in the case of bulk purchase, the costs can be even lowered. This makes the disclosed device more economic and more competitive than the existing patented devices.

5. Effective removal of in-car toxic substances generated under high temperature: the car interior usually includes parts made of plastic and rubber and contains adhesive, and these when long staying in a high-temperature environment can emit toxic substances that is harmful to human body such as formaldehyde and xylene. The present invention works on first activating the window-activating unit and then activating the AC-activating unit, so as to form the triangular helix airflow having pressure differences, which lowers the in-car temperature rapidly and makes in-car toxic substances shoved out of the car together with the hot air.

In addition to the four control buttons A, B, C, D each corresponding to one of the four control units, the wireless remote control 11 of the present invention may further have an automatic control button E. When pressed, the automatic control button E transmits an operational signal that activates an IC-activating unit (not shown). The IC activating unit allows the user to make the power-activating unit 21, the engine-starting unit 22, the window-activating unit 23 and the AC-activating unit 24 automatically start in order through a one-touch operation. Moreover, in cold, winter days, the user can operate the disclosed device similarly to make the air conditioner system send out warm air and blow air downward, so as to gradually increase the in-car temperature and make passengers in the car feel warm and comfortable.

What is claimed is:

1. An in-car temperature-controlling device for a car in its parked state, the in-car temperature-controlling device comprising:
   a wireless remote control, for a user to remotely transmit an operational signal;
   a receiver, installed in the car, receiving the operational signal from the wireless remote control and correspondingly sending a control signal;
   a controller circuit board, for receiving and processing the control signal from the receiver and outputting a control command; and
   a motherboard, receiving the control command from the controller circuit board and being electrically connected to a power-activating unit, an engine-starting unit, a window-activating unit and an AC-activating unit of the car, wherein the motherboard, according to the control command, controls the power-activating unit, the engine-starting unit, the window-activating unit and the AC-activating unit to operate in order;
   wherein, when operating, the window-activating unit makes four windows of the car move downward synchronously, and when operating, the AC-activating unit generates downward blown cool air in the car.

2. The in-car temperature-controlling device of claim 1, wherein the receiver, the controller circuit board and the motherboard are all housed in a control box.

3. The in-car temperature-controlling device of claim 1, wherein the wireless remote control is provided with four control buttons, each for turning on and off one of the power-activating unit, the engine-starting unit, the window-activating unit and the AC-activating unit.

4. The in-car temperature-controlling device of claim 3, wherein the wireless remote control is provided with an automatic control button, for controlling the power-activating unit, the engine-starting unit, the window-activating unit and the AC-activating unit to automatically start in order.

5. The in-car temperature-controlling device of claim 1, wherein the wireless remote control is provided with an automatic control button, for controlling the power-activating unit, the engine-starting unit, the window-activating unit and the AC-activating unit to automatically start in order.

6. The in-car temperature-controlling device of claim 1, wherein transmission of the operational signal between the wireless remote control and the receiver is achieved by using one of wireless telephone signals , WIFI, short distance wireless communication signals and infrared transmission.

7. The in-car temperature-controlling device of claim 1, wherein the four windows of the car move downward at least 5 cm.

8. The in-car temperature-controlling device of claim 1, wherein the four windows of the car move downward at most 5 cm.

* * * * *